July 18, 1950 C. R. MOLINE 2,515,886
BRAKE BEAM WITH NUT LOCK AND RETAINER MEANS
Filed May 1, 1946 3 Sheets-Sheet 1
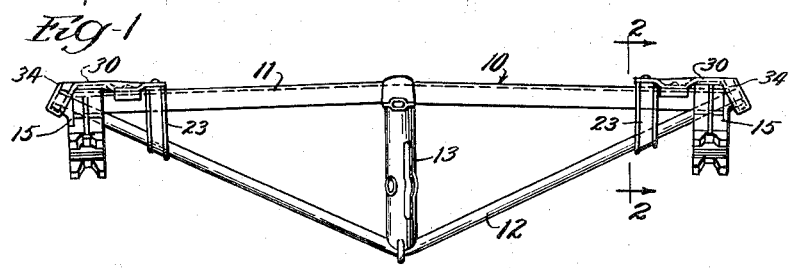
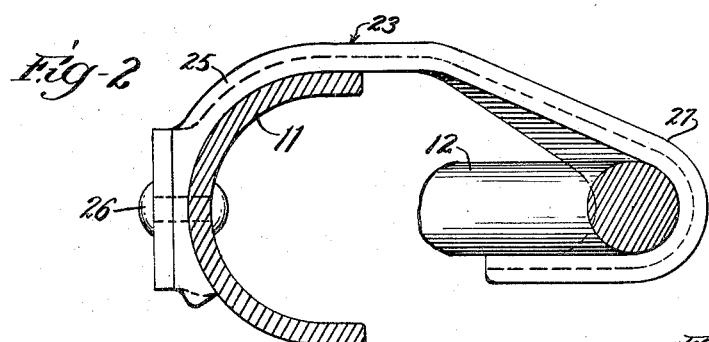
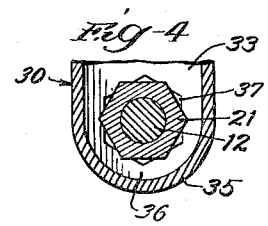
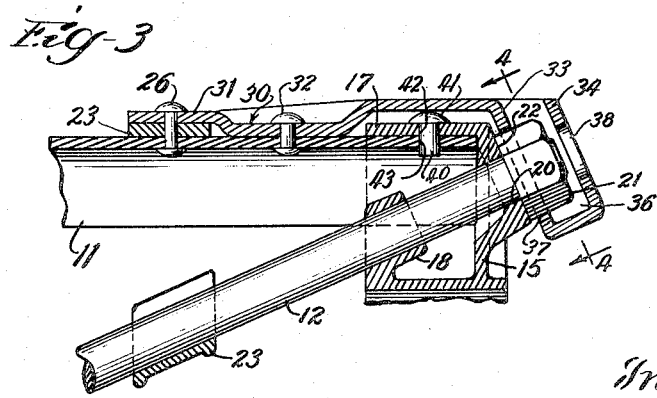
Inventor
Carl R. Moline July 18, 1950  C. R. MOLINE  2,515,886
BRAKE BEAM WITH NUT LOCK AND RETAINER MEANS
Filed May 1, 1946  3 Sheets-Sheet 2
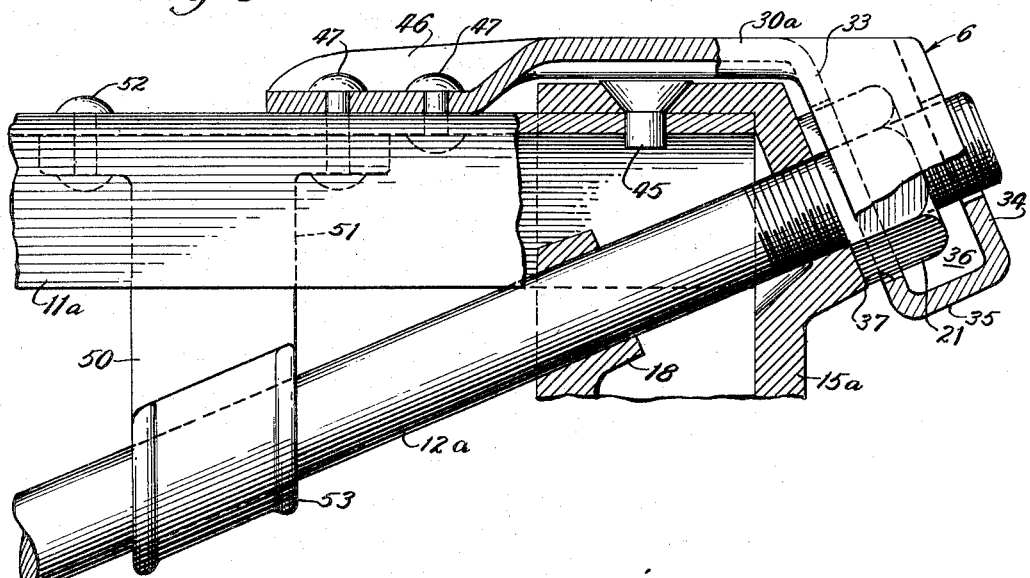
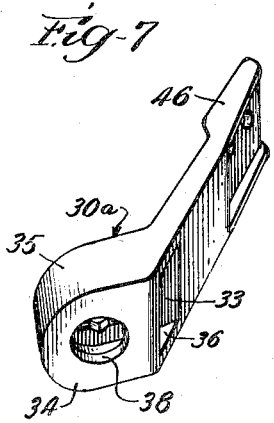
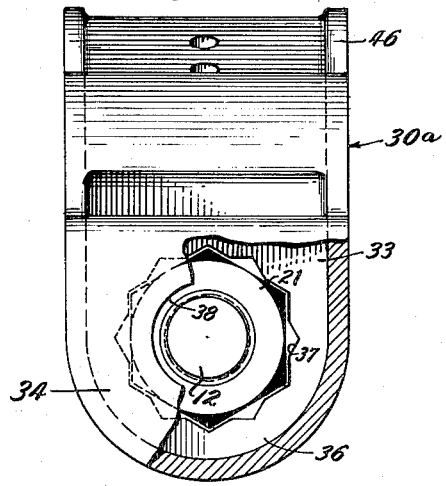
Inventor.
Carl R. Moline.
By:- Mann and Brown
Attys.

July 18, 1950  C. R. MOLINE  2,515,886
BRAKE BEAM WITH NUT LOCK AND RETAINER MEANS
Filed May 1, 1946  3 Sheets-Sheet 3
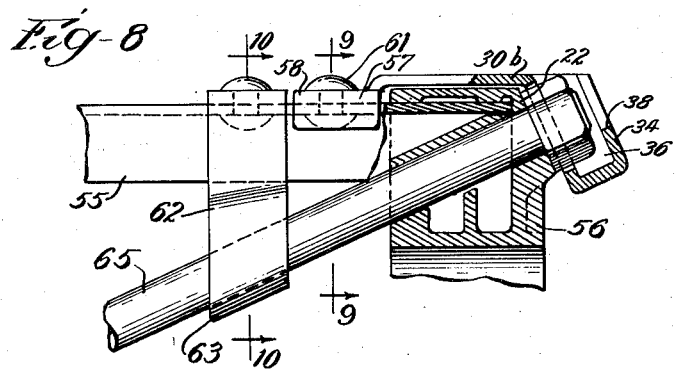
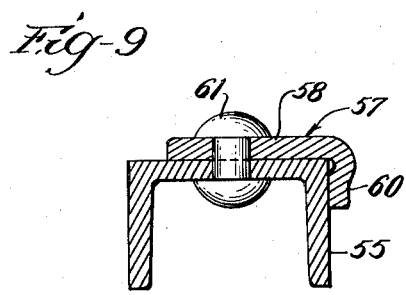
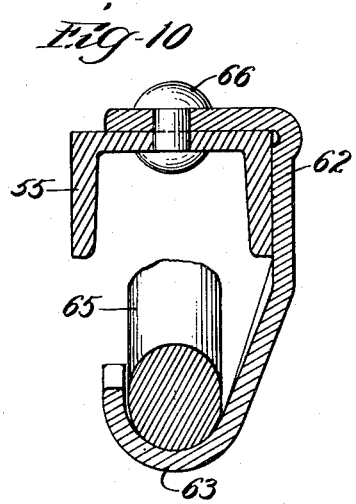
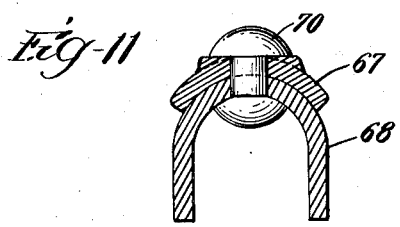
Inventor
Carl R. Moline
By: Mann and Brown
Attys.

Patented July 18, 1950

2,515,886

UNITED STATES PATENT OFFICE 2,515,886

BRAKE BEAM WITH NUT LOCK AND RETAINER MEANS

Carl R. Moline, Homewood, Ill., assignor to American Steel Foundries, Chicago, Ill., a corporation of New Jersey Application May 1, 1946, Serial No. 666,356

2 Claims. (Cl. 188—224.1)

My invention relates to brake beams employed on railway cars, with special reference to the parts of a brake beam assembly that are associated with the brake heads at each end of the brake beam. While the invention is applicable in its various aspects to various types of brake beams, it is especially advantageous in a brake beam assembly of the type disclosed in my Patent No. 2,391,329, entitled Brake Head Retaining Mechanism for Brake Beams, issued December 18, 1945. For the purpose of disclosure such an application of the invention will be described herein, no limitation by the specific disclosure being implied.

A failure in the structure of a brake beam may be hazardous because it disrupts the operation of the brake system, or may be hazardous because pieces or parts of the brake beam assembly are thereby released to drop under the car wheels, or may be hazardous for both reasons at the same time. With increasing speeds of operation of modern trains the structural reliability of brake beams becomes more important than ever.

The present development is based on the concept that high structural reliability in a brake beam assembly may be attained by providing what may be termed a plurality of sub-combinations so overlapping in function that the failure of one structural element with the consequent disorganization of one sub-combination merely permits another sub-combination that does not include the defective part to take over the same function. Thus, if one sub-combination comprising parts A, B and C, and a second sub-combination comprising parts A, B and D, both serve a structural function in common, say, the function of retaining a brake head in place on the end of the brake beam, then part C alone may fail or part D alone may fail without destroying that common function. The brake head will be retained in either event.

The general object of my invention is to embody this principle in a brake beam assembly, and it is my special purpose to provide such a number of functionally overlapping sub-combinations in the brake beam assembly, and such a variety of overlapping sub-combinations, as to afford ample reserve protection for the important focal points of stress in the break beam assembly.

One of the special objects of my invention is to provide a novel safeguard to be effective in the event that the tension member in a brake beam assembly breaks in two. The new safeguard prevents dislodgment of the severed end of the tension member. In general this special object is attained by providing a combined brake head retainer and nut lock that has the added function of blocking outward axial movement of the tension rod.

A feature of the preferred practice of my invention is that the structure added to the combined retainer and nut lock strengthens the combined retainer for its other functions of retaining the brake head and preventing rotation of the nut. In my preferred practice I add to this combined retainer or multiple purpose retainer the fourth function of retaining a headed pin, as will be explained in my detailed description.

A brake beam assembly of the present type, as exemplified by the above-mentioned patent, includes a retaining member that interconnects the tension member and the compression member of the brake beam assembly near each of the two brake heads in such manner as to prevent the tension and compression members from spreading apart at their ends. A further specific object of the present disclosure is to provide a simple one-piece hanger for this purpose that will engage the compression member on which it is mounted in such manner as to require but a single rivet for its anchorage.

Other objects and advantages of my invention will be apparent in my detailed description to follow, taken with the accompanying drawings.

In the drawings, which are to be regarded merely as illustrative:

Fig. 1 is a plan view of a brake beam assembly incorporating the preferred form of my invention;

Fig. 2 is a section, on a greatly enlarged scale, taken as indicated by the line 2—2 in Fig. 1;

Fig. 3 is a longitudinal section of one end of the brake beam assembly on an enlarged scale;

Fig. 4 is a sectional view taken as indicated by the line 4—4 of Fig. 3;

Fig. 5 is a view of the end portion of a brake beam, partly in plan and partly in section, showing a modified form of the invention;

Fig. 6 is an elevation of a combined brake head retainer and nut lock, the view being partly broken away and being taken as indicated by the arrow 6 in Fig. 5;

Fig. 7 is a perspective view, on a reduced scale, of the combined brake head retainer and nut lock;

Fig. 8 is a view similar to Fig. 3, showing another form of the invention;

Figs. 9 and 10 are transverse sections taken as indicated by the lines 9—9 and 10—10, respectively, in Fig. 8; and Fig. 11 is a view similar to Fig. 9, illustrating a modification of the structure in Fig. 8.

The brake beam assembly, generally designated by the numeral 10 in Fig. 1, includes the usual compression member 11 that is channel shaped in cross-sectional configuration and the usual tension member 12, these two members being interconnected at the middle of the assembly by a strut or fulcrum member 13. The end portions of the compression member 11 and tension member 12, at each end of the brake beam assembly, converge and are interconnected by a brake head 15, the brake head here shown being of the sleeve head type.

As best shown in Fig. 3, each brake head 15 has an outer portion or wall 17 that fits closely around the periphery of the compression member 11. In this instance the compression member 11 is rounded in cross-sectional configuration, and the outer portion 17 of the brake head 15 conforms to the same curvature. The tension member 12 at each end of the brake beam assembly extends through an inner cylindrical portion 18 of the brake head 15 and also through a coaxial opening 20. The usual hexagonal nut 21 on the end of the tension member 12 is in abutment with an outer inclined face 22 of the brake head, and serves as the primary means to maintain the brake head in its assembled position. As will be explained, the nut is one of several expedients to prevent separation of the brake head from the rest of the brake beam assembly.

The construction of the brake head 15 as above described, and as thus shown in Fig. 3, provides a path of withdrawal of the tension member from the brake head that diverges from the compression member, so that lateral movement of the tension member away from the compression member is required for separation of the tension member from the assembled brake head. Any means that will prevent such spreading apart of the compression member 11 and the tension member 12 will, therefore, serve as a further expedient to prevent release of the brake head 15 from its assembled position.

In the present construction one such anti-spreading expedient comprises an interconnecting means or retaining means which may be in the form of a C-shaped member 23. As shown in Figs. 2 and 3, one end portion 25 of the C-shaped anti-spreading member 23 is curved to lie snugly against the periphery of the compression member 11, and therefore only a single rivet 26 is required for securing these C-shaped members to the compression member in a positive and rigid manner. The other end portion 27 of the C-shaped member 23 is curved to fit the circumference of the rod-shaped tension member 12, and is also inclined to conform to the angle of the tension member. It is apparent that the C-shaped member 23, in holding the ends of the compression member 11 and tension member 12 against spreading away from each other, constitutes an expedient to retain the corresponding brake head 15 in assembled position on the end of the brake beam, which expedient is effective even in the absence of the hexagonal nut 21.

On each end of the brake beam assembly a third expedient to prevent dislodgment of the corresponding brake head 15 comprises a retaining means 30 which may be aptly termed a combined retaining means since it is a combined brake head retainer and nut lock. This combined retaining means 30 has a shank portion adapted to be secured to the compression member 11 by suitable rivets. In the present construction the end of the shank portion is offset, as indicated at 31, to overlie the C-shaped member 23 so that the previously mentioned rivet 26 may anchor both the combined retaining means 30 and the C-shaped member 23 to the compression member 11. A second rivet 32 anchors the combined retaining means 30 to the compression member at a second point.

The combined retaining means 30 extends around the corresponding brake head 15 and provides at its outer end two spaced walls 33 and 34 that overhang the inclined face 22 on the outer side of the brake head 15. Preferably these two overhanging walls 33 and 34 are interconnected peripherally by a third wall 35, so that the three walls form a pocket 36 at the outer end of the combined retaining means.

As shown in Fig. 4, the inner wall 33 of the two overhanging walls has a non-circular opening 37 to receive the corresponding hexagonal nut 21 for locking the nut against rotation. Preferably the opening 37 has twelve angles for permitting relatively fine adjustment of the nut. The outer wall 34 of the two overhanging walls is positioned to block outward axial movement of the nut 21, and it is to be noted that the outer wall 34 is close enough to the inner wall 33 to prevent the nut 21 from escaping outward from the non-circular opening 37 in the inner wall. Preferably the outer overhanging wall 34 has an aperture 38 slightly larger in diameter than the tension member 12 to clear the end of the tension member, if necessary.

Preferably a further expedient to prevent movement of a brake head 15 at the end of the brake beam assembly out of its normal position is provided. This additional expedient comprises a simple rivet 40 with a head 41, which rivet is loosely fitted into two registered bores 42 and 43 in the brake head 15 and in the compression member 11, respectively. It is to be noted that the combined retaining means 30 extends across the rivet 40 and thereby blocks withdrawal movement of the rivet from its effective position. While the rivet is only loosely held in place, nevertheless it serves in a positive manner to block outward movement of the brake head relative to the compression member. Thus I solve the problem of providing a rivet fastening means at this location where there is not enough room within the brake head to accommodate a tool for bucking a rivet.

It is apparent, then, that there are four distinct sub-combinations acting independently to maintain each of the brake heads 15 in its assembled position, the sub-combinations being: first, the combination of the nut 21 and the tension member 12 on which the nut is threaded; second, the C-shaped member 23 in combination with the compression member 11 on which it is mounted, and, of course, in combination with the brake head with respect to the heretofore mentioned spreading action inherent in the brake head; third, the combination of the combined retaining means 30 and the compression member 11 on which it is mounted, the combined retaining means providing the overhanging wall 33 adjacent the outer side of the brake head; and finally, the rivet 40 in combination with the compression member 11 that it engages and also in combination with the retaining means 30 that blocks withdrawal of the rivet.

Since these four expedients or sub-combinations differ in their constituent elements it is apparent that a number of the elements may fail and still leave at least one of the sub-combinations effective for the purpose of keeping the brake head 15 in its assembled position.

A feature of the invention in the form shown in Figs. 1 to 4 is the number of functions performed by the combined retaining means 30. These functions are: first, to block outward movement of the corresponding brake head 15; second, to lock the nut 21 against rotation; third, to block outward axial movement of the nut; and fourth, to block withdrawal of the loose rivet 40. Even if the outer overhanging end of the combined retaining member 30 were to be broken off, the remainder would serve to block withdrawal of the rivet 40.

An important advantage of providing each of the combined retaining means 30 with an outer wall 34 in the path of outward movement of the corresponding nut 21 may be understood by considering what would be the effect of one of the brake heads 15 breaking in such manner as to no longer cooperate with the associated nut 21. As long as each of the brake heads 15 is in effective abutment with the inner face of the corresponding nut 21, the tension member 12 is effectively anchored against longitudinal movement since longitudinal movement in one direction is opposed by one of the two nuts, and longitudinal movement in the opposite direction is opposed by the other of the two nuts.

If one of the brake heads 15 were to fail completely the outer overhanging wall 34 of the two combined retaining means 30 at the ends of the brake beam assembly would serve the same purpose, since one of the outer walls 34 in cooperation with the corresponding nut 21 would oppose longitudinal movement of the tension member 12 in one direction, while the outer wall 34 on the other end of the brake beam assembly, in combination with the other nut, would oppose the opposite longitudinal movement of the tension member. Thus the nut and the brake head at each end of the brake beam assembly forms a sub-combination having the primary purpose of interconnecting the tension member and the compression member as well as the purpose of securing the tension member against longitudinal movement, while the nut, together with the combined retaining means 30 at each end of the brake beam, comprise a second sub-combination that may perform the same function if such performance is made necessary by failure of the first sub-combination.

A special advantage of providing each of the retaining means 30 with an overhanging outer wall 34 to block outward movement of the corresponding nut 21 is that the tension member 12 may be broken into two pieces without danger of either of the two pieces shifting or traveling longitudinally outward through the corresponding brake head 15. Each overhanging outer wall 34 blocks axial outward movement of the corresponding nut 21 and is close enough to the corresponding inner wall 33 to confine the nut to the non-circular aperture 37 in the inner wall. Thus the outer wall 34 provides insurance against the corresponding nut rotating even when the tension member 12 is broken into two pieces. In the event the tension member 12 breaks into two pieces there may be a tendency for each of the two pieces of the broken tension member to thread its way longitudinally outward through the corresponding nut 21. When the end of the threads on the end of the tension member 12 is reached, however, such outward threading action is stopped since the nut is locked against rotation.

The second form of the invention shown in Figs. 5, 6 and 7 is largely similar to the form just described, as indicated by the use of corresponding numerals to indicate corresponding parts. The compression member 11a chosen for illustration is of rectangular cross-sectional configuration with a flat back or web 14. The tension member 12 and each of the brake heads 15a are of the same general construction as heretofore described. A flat head rivet 45 is, however, substituted for the previous round head rivet 40, and the bore 42 for the rivets and the brake head 15a is countersunk to avoid protrudence of the rivet head.

The combined retaining means 30a shown in Figs. 5, 6 and 7 is similar to the previously described retaining means 30, but has a shorter shank or base portion 46, which base portion is anchored to the compression member 11 by suitable rivets 47. Instead of the previously described C-shaped retaining or anti-spreading member 23 I may employ a member 50 for the same purpose. The anti-spreading member 50 has a base portion 51 that fits inside the channel of the compression member 11 and is secured thereto by one of the previously mentioned rivets 47 and a third rivet 52. The outer end 53 of the member 50 is curved and inclined in the manner heretofore described for effective engagement with the tension member 12. An important feature is that the anti-spreading member 50 may be readily applied to existing brake beam assemblies without the necessity for dismantling such assemblies to any degree whatsoever.

The form of the invention shown in Figs. 8, 9 and 10 is largely similar to the forms heretofore described. The particular compression member 55, chosen for illustration, is of rectangular channel shape in cross-sectional configuration, as shown, and the brake head 56 conforms to such configuration. A combined retaining means 30b is employed, which combined means is of the same general construction heretofore described, as indicated by corresponding numerals used for corresponding parts. The combined retaining means 30b differs, however, in its base portion 57 by means of which it is attached to the compression member 55. The base portion is angular in cross-sectional configuration, comprising a web 58 with a flange 60, the web and flange being shaped and dimensioned to lie snugly against the back and one side or flange, respectively, of the compression member. By virtue of this construction of the base portion 57 the combined retaining means 30b is secured rigidly to the compression member 55 by a single rivet 61.

Adjacent the inner end of the combined retaining means 30b is an anti-spreading member 62 having a hook-shaped portion 63 at one end to engage the rod-shaped tension member 65, and having a base portion at the other end adapted for attachment to the compression member 55. The base portion of the anti-spreading member 62 is of angular configuration, as shown in Fig. 10, to lie snugly against the outer surfaces of both the back and one flange of the compression member. By virtue of this configuration the anti-spreading member 62 is rigidly secured to the compression member by a single rivet 66.

If the channel-shaped compression member in Fig. 8 were of rounded cross-sectional configuration the base portion of the described combined retaining means 30b would be shaped to corresponding rounded configuration. The sectional view of Fig. 11 shows, by way of example, how a base portion 67 of a combined retaining means may be shaped to lie snugly against the curved surface of a compression member 68. It is apparent that the base portion 67 is of sufficient extent transversely of the compression member to be anchored rigidly thereto by a single rivet 70.

While the invention has been shown applied to brake beam assemblies having compression members of given channel-shaped cross-sectional configuration, it is to be understood that the invention may be practiced with compression members of other configurations.

My description herein in specific detail of two embodiments of the invention for the purpose of disclosure and to illustrate the principles involved will suggest to those skilled in the art various changes and substitutions within the scope of the appended claims.

I claim as my invention:

1. In a brake beam, a truss structure comprising tension and compression members, a strut between intermediate portions of said members, brake heads mounted on the ends of said structure, nuts on the ends of said tension member abutting the outboard sides of said heads, and a combined nut lock and retainer element at each end of said structure comprising a portion overlapping the rear side of the adjacent head and connected to said compression member inboardly of said head, a wall connected to said portion and extending around the outboard side of the adjacent head and sleeved over the corresponding nut to prevent unwanted rotation of the nut, another wall spaced from said first-mentioned wall to limit outward movement of the nut, and a U-shaped web surrounding said nut and interconnecting said walls, said first-mentioned wall being spaced from the associated head a distance less than the axial dimension of the nut and the second-mentioned wall being spaced from said first-mentioned wall a distance less than said dimension of said nut whereby said nut is prevented from escaping between said first-mentioned wall and said head or between said walls in the event the tension member is broken and said nut becomes disconnected therefrom, said web preventing separation of said walls.

2. In a brake beam, a truss structure comprising tension and compression members, brake heads mounted on the ends of said members, each of said heads providing a path of withdrawal therefrom for said tension member diverging with respect to said compression member, thereby requiring lateral movement of the tension member relative to the compression member for separation of the tension member from the assembled brake head, nuts on the outer ends of said tension member abutting the outer sides of said brake heads, clamp members interconnecting the tension member and the compression member adjacent each end of the structure inwardly of the corresponding brake head to prevent the said members from spreading apart at their ends, each clamp member having a hook-shaped portion to engage said tension member and having a base portion extending over and in back of said compression member, a retaining element for each brake head comprising a rivet having an abutment seated against the rear of the head and having a shank extending through aligned openings in the head and compression member, a combined nut lock and brake head retaining means at each end of said compression member connected thereto and having a wall extending across the rear of the adjacent brake head in overlapping relationship to the abutment means of the adjacent retaining member and overlapping the base portion of the adjacent clamp and connected therewith to said compression member, said wall extending around the outboard side of the adjacent head and apertured to surround the corresponding nut to prevent rotation thereof, said retaining means having a second wall spaced outward from said first-mentioned wall to limit outward movement of the nut, and a U-shaped web surrounding the nut and connecting said walls.

CARL R. MOLINE.

REFERENCES CITED

The following references are of record in the file of this patent:

UNITED STATES PATENTS

| Number | Name | Date |
|---|---|---|
| 448,929 | Sceets | Mar. 24, 1891 |
| 503,441 | Simpson | Aug. 15, 1893 |
| 528,238 | Robischung | Oct. 30, 1894 |
| 609,396 | Aglar | Aug. 23, 1898 |
| 990,938 | Williams | May 2, 1911 |
| 1,024,291 | Stein | Apr. 23, 1912 |
| 1,313,982 | Chandler | Aug. 26, 1919 |
| 2,391,329 | Moline | Dec. 18, 1945 |